Feb. 23, 1943.   L. D. TYSON   2,312,292
THERMOSTATIC COOLING CONTROLS
Filed Nov. 30, 1940
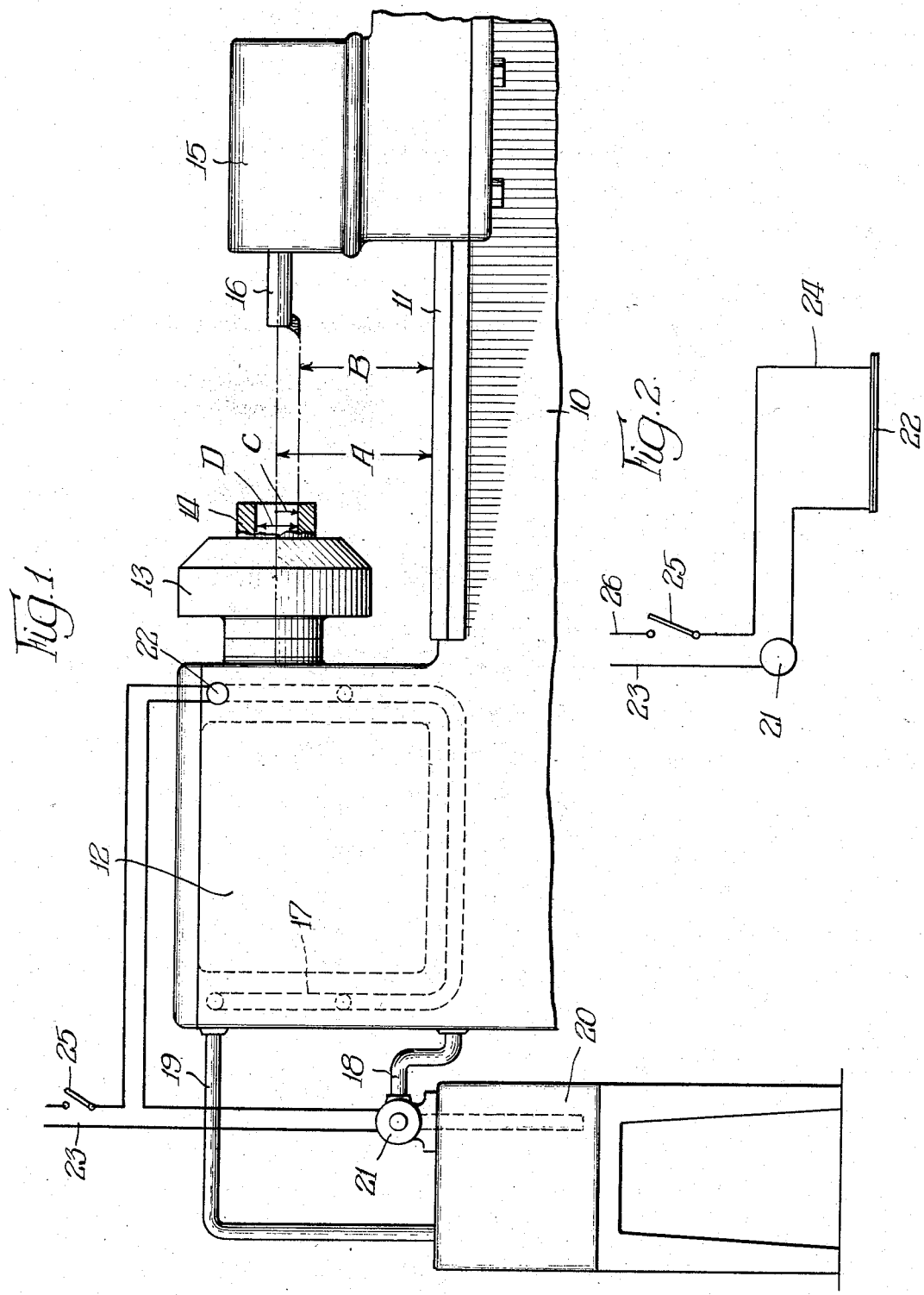
INVENTOR.
Levi D. Tyson,
BY Patented Feb. 23, 1943

2,312,292

UNITED STATES PATENT OFFICE 2,312,292

THERMOSTATIC COOLING CONTROLS

Levi D. Tyson, Elkhart, Ind., assignor to International Machine Tool Corporation, a corporation of Indiana Application November 30, 1940, Serial No. 367,905

2 Claims. (Cl. 82—32)

The present invention relates to improvements in thermostatic cooling controls.

In application Serial No. 345,922, filed by the present applicant on July 17, 1940, there are described improvements in thermostatic controls for machine tools embodying mechanism for communicating heat in a controlled manner to machine tools or the like whereby uniform temperatures and consequently uniform dimensions may be maintained at all times whether such machine tools or the like are idle or in operation.

The present invention is concerned with control mechanism for delivering cooling medium to those parts of machine tools or the like which tend to become heated when in operation.

An object of the present invention is to provide machine tool mechanism having instrumentalities for simplifying the preservation of the settings of the parts regardless of the fact that such settings may be made when the mechanism is stationary.

A further object is to provide machine tool mechanism having controlled cooling means for preventing the machine from departing beyond prescribed limits from settings made when the mechanism is stationary.

A further object is to provide controllable cooling means for machine tool mechanism well adapted to meet the needs of commercial operation.

Further objects will appear as the description proceeds.

Referring to the drawing—

Figure 1 is a view in side elevation showing more or less diagrammatically a lathe embodying the principles of the present invention; and Figure 2 is an electrical diagram illustrating an electrical arrangement which may be employed in the practice of the present invention.

The numeral 10 indicates the bed of a lathe and the numeral 11 indicates the ways carried by said bed. The numeral 12 indicates the headstock provided with the rotating chuck 13 carrying a rotatable piece of work 14. The numeral 15 indicates a tailstock provided with the relatively stationary tool 16 adapted for boring a hole in the piece of work 14.

The headstock 12 is provided with cooling passageways, indicated generally by the numeral 17. Cooling medium which may be water, an antifreeze mixture, oil, or other liquid, is delivered to the cooling passageways 17 through the inlet pipe 18 and is discharged through the outlet pipe 19. The discharge pipe 19 leads to the cooling unit 20, and connected to the cooling unit 20 is the motor pump 21 for delivering cooling fluid to the inlet pipe 18. The cooling unit may be of any of the types to be purchased in the open market, such as the ordinary electric water cooler; or if water mains are convenient cold water may be admitted directly from a water supply and discharged through the outlet pipe 19, in which case the motor 21 may operate a valve in the inlet pipe 18. The cooling passageways are, of course, independent of the lubricating system of the machine.

The numeral 22 indicates a thermostat positioned to be responsive to temperature within the headstock 12. The electric circuit of the motor pump 21 and the thermostat 22 may be chosen as desired. Merely for the purpose of illustration, an electric circuit is indicated in Figure 2, in which one electric wire 23 is connected to one terminal of the motor 21. The other terminal of the motor 21 is connected to one terminal of the thermostat 22. The other terminal, indicated by the numeral 24, of the thermostat 22 is connected through the switch 25 to the wire 26, constituting the other side of the electric circuit. Electrical connection between the wires 23 and 26 (assuming the switch 25 to be closed) is controlled by means of the thermostat 22, which is adapted to close the contact 24 when the temperature in the vicinity of the thermostat reaches a predetermined value but which breaks contact with the contact 22 when a predetermined lower temperature is reached.

The mode of operation of the above described embodiment of the present invention is substantially as follows:

The setting of the tool 16 and other parts of the lathe may be made with the lathe at rest and at room temperature or at any preferred temperature. The thermostat 22 will be so adjusted as to just break contact with the contactor 24 at this temperature. No further current is used until the temperature in the headstock 12, as indicated by the thermostat 22, rises slightly above the original temperature. The thermostat 22 will engage the contactor 24, completing the circuit through the motor pump 21 (assuming the switch 25 to be closed), thereby delivering cooling medium through the inlet pipe 18, cooling passageways 17 and the outlet pipe 19, bringing the temperature of the headstock 12 down to the value for which the thermostat is set. When said headstock 12 has acquired this temperature the thermostat 22 will break contact with the contactor 24, stopping the operation of the motor pump 21 and the circulation of the cooling medium through the cooling passageways 17. The thermostat 22 will operate in the well understood manner to maintain the desired temperature within predetermined limits.

In explaining the applicability of the present invention to practical service it may be pointed out that in Figure 1 the dimension A is the height from the ways to the axis of rotation of the chuck 13, B is the height from the ways to the cutting point of the tool 16, C is the radius of the cut, and D is the diameter of the cut.

The dimension A is changeable, of course, when the headstock varies from its initial temperature. For example, at room temperature the dimension A may be exactly 10 inches. It may be assumed that the dimension B is 8 inches; then D equals $(10-8) \times 2 = 4.000$ inches.

When the machine (not equipped with the present invention) is started from room temperature the bore will be 4.000 inches, but as the machine continues to operate, the headstock develops a running temperature which varies with different machines. Variations of from 50 to 75 degrees are not uncommon. The metal of the headstock therefore expands and the dimension A may increase as much as .005 inch, or even more. The dimension B does not change but remains at 8 inches. Under the conditions just mentioned, D equals $(10.005-8) \times 2 = 4.010$ inches, which is a serious deviation on many classes of work. Similar errors would occur on turning cuts, and in the case of a reamer it is obvious that a true hole could not be reamed when the reamer gets out of line with the axis of the rotating piece of work. According to prior practice, the operator has been required to change the adjustment of his tool during the entire warming up period, which may be from one to two hours in duration. In the case of reamers, floating holders are used. Both expedients are objectionable.

According to the present invention the difficulties above referred to have been avoided. The settings of the parts may be made with the headstock 12 at room temperature or at any preferred running temperature. At this point the thermostat 22 is adjusted so that it just cuts out the current to the motor pump 21. No further current flows until the headstock 12 tends to heat up, in which case after the temperature has raised a small amount the thermostat 22 cuts in the motor pump 21, bringing the temperature of the headstock 12 back to the desired running condition, at which time the thermostat 22 breaks the circuit of the motor pump 21. The temperature of the headstock is maintained constant within close limits, and consequently the relative placement of the cutting tool 16 and the piece of work 14 being operated upon is automatically maintained.

Though the above description has been directed more particularly to the matter of preserving the settings in a direction normal to the axis of rotation of the chuck 13, it will be understood, of course, that the temperature control will also preserve settings in a direction along the axis of the chuck 13.

Though the present invention has been described in connection with a lathe, it will be understood that it is also applicable to other mechanisms wherein one part tends to heat up in operation while cooperating parts have less tendency to heat up.

Though a preferred embodiment of the present invention has been described in detail, many modifications will occur to those skilled in the art. It is intended to cover all such modifications that fall within the scope of the appended claims.

What is claimed is:

1. In a machine, in combination, a tool member, a work holding member, one of said members being rotatable relative to the other of said members, metallic means for supporting said rotatable member, means for communicating cooling medium to said supporting means, said communicating means being operable independently of movement of either of said members and independently of the lubrication system of said machine, and thermostatic means directly responsive to the temperature of the metal of said supporting means for controlling the operativeness of said communicating means.

2. In a lathe, in combination, a metallic headstock, means carried by said headstock for rotatably supporting a piece of work to be operated upon, a tool adapted to operate upon said piece of work, means for communicating cooling medium to said headstock, said communicating means being operable independently of movement of either of said members and independently of the lubrication system of said machine, and thermostatic means directly responsive to the temperature of the metal of said headstock for controlling the operativeness of said communicating means.

LEVI D. TYSON.